United States Patent [19]

Kaiser et al.

[11] Patent Number: 5,070,512
[45] Date of Patent: Dec. 3, 1991

[54] INTERFERENCE FIT LASER DISK

[75] Inventors: Jeffrey L. Kaiser, Mountain View; David L. Wright; Denes A. Hegedus, both of Redwood City; Alan B. Peterson, Palo Alto, all of Calif.

[73] Assignee: Spectra-Physics, Inc., San Jose, Calif.

[21] Appl. No.: 228,285

[22] Filed: Sep. 19, 1988

[51] Int. Cl.$^5$ ................................................ H01S 3/03
[52] U.S. Cl. ........................................ 372/65; 372/34; 372/62; 372/61
[58] Field of Search ........................ 372/61, 62, 64, 34

[56] References Cited

U.S. PATENT DOCUMENTS 4,553,241 11/1985 Chaffee .................................. 372/62
4,683,575 7/1987 Carlson et al. ....................... 372/62

Primary Examiner—Léon Scott, Jr.
Attorney, Agent, or Firm—Lyon & Lyon

[57] ABSTRACT

A disk, or heat web, is generally circularly shaped, and has a circumferential lip normal to the plane of the disk. A split ring, fabricated from a material having a low co-efficient of thermal expansion fits within the circumferential lip. A generally circularly shaped expansion member, made from a material having a relatively high coefficient of thermal expansion, fits within the split ring. A suitable brazing material is placed between the split ring and the circumferential lip of the disk. The heat produced by the brazing process expands the split ring and allows it to be brazed into place when the assembly is placed on the inside of the cylindrical member.

4 Claims, 1 Drawing Sheet

INTERFERENCE FIT LASER DISK

BACKGROUND OF THE INVENTION

1. Field Of The Invention

The present invention relates to securing of mechanical parts by the use of an interference fit. The present invention finds particular application in laser technology, wherein boreconfining elements, such as disks must be mechanically secured to the inside walls of the laser tube in such a manner to allow for a low thermal resistance between the disk and the wall of the laser tube.

2. The Prior Art

Both interference fit and braze connected bore assemblies for lasers are known in the prior art. For example, U.S. Pat. No. 3,501,714 to Myers et al., discloses the use of disks having an initially slightly larger diameter than the inside diameter of the surrounding laser tube. Upon insertion into the laser tube, spring members formed on the disk are slightly compressed, insuring good thermal contact with the laser tube. U.S. Pat. No. 4,376,328 to Mefferd, discloses a process by which copper cups are brazed to the inside of a ceramic laser tube.

BRIEF DESCRIPTION OF THE INVENTION

The present invention is an interference fit disk which finds use in laser applications. A metallic disk or heat web, preferably made of copper, has an outside diameter which allows it to be slideably fit into the inside diameter of a laser tube fabricated from, for instance, aluminum oxide. A split ring, fabricated from a material having a low coefficient of thermal expansion, such as molybdenum, or kovar, has an outside diameter which allows it to be placed inside of the copper heat web. A layer of brazing material such as CuSil is placed between the copper heat web and the split ring. An expansion element, in a preferred embodiment a steel ring having an outside diameter such that it slideably fits within the inside diameter of the split ring, is placed within the split ring.

The heat web, the split ring and expansion ring are placed within the laser tube. Some braze material is placed between the copper heat web and the molybdenum split ring and the assembly is brazed. As the assembly heats, the steel ring, having a larger coefficient of thermal expansion than the molybdenum, and the aluminum oxide, will tend to expand the members surrounding it against the inside wall of the aluminum oxide tube. As the split molybdenum ring expands, its gap or split widens and it becomes pressed into tight contact with the copper against the wall of the alumina tube. At the melting point of the brazing alloy, the molybdenum ring becomes brazed to the copper.

As the assembly cools, the alumina, having a higher coefficient of expansion than the molybdenum split ring, contracts around the copper and molybdenum inner rings.

DETAILED DESCRIPTION OF A PREFERRED EMBODIMENT

Figure 1:
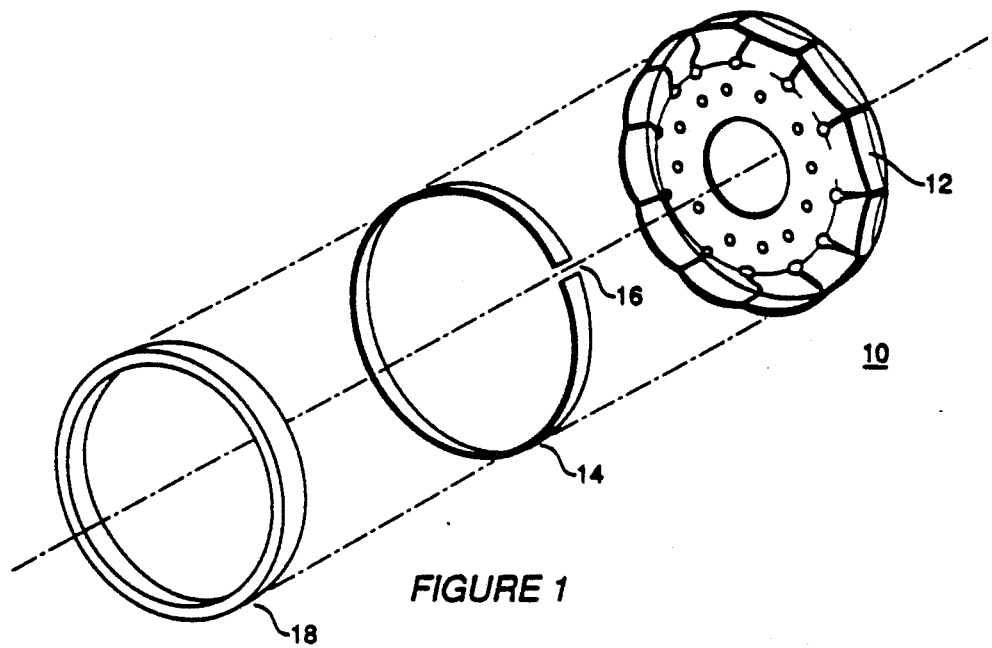
FIG. 1 is an exploded view of an assembly according to the present invention, including an expansion member, a split ring, and a heat web.

Referring first to FIG. 1, a heat web 10 is generally disk shaped which may have segmented fingers 12 running in a direction normal to the plane of the disk located around the circumference of the disk. A heat web 10 may also be provided without fingers 12, i.e., a continuous cylindrical lip at the edge of heat web 10 may be provided. The outside surfaces of these fingers 12 will be the surface which contacts the inside diameter of the laser tube wall. A split ring 14 having a gap 16 fits into and contacts the inner surfaces of fingers 12 of the heat web 10. An expansion member 18 fits into the inside diameter of split ring 14.

Heat web 10 is preferably made of copper or another material having good thermal conductivity. Split ring 14 is preferably made of a material, such as molybdenum having a relatively low coefficient of thermal expansion when compared with the coefficient of thermal expansion of the laser tube into which the assembly is to be placed. If the laser tube is made of alumina, then split ring 14 may be fabricated from molybdenum, or Kovar, a nickel iron alloy, or tungsten.

Expansion member 18 may be fabricated from a material having a relatively high coefficient of expansion when compared with the coefficient of expansion of the material from which the laser tube is made. In the case of an alumina laser tube, expansion member 18 may be a steel ring.

Split ring 14 should be thick enough to be able to handle the compression forces which will be placed upon it by the alumina tube but not so thick as to place too high a stress on the alumina tube which would result in cracking the tube. It has been found, for instance, that a molybdenum split ring having a thickness of from between 0.01 to 0.03 inches works satisfactorily.

To assemble the apparatus of the present invention inside of a laser tube, the split ring 14 is placed within the heat web 12 with a layer of brazing material in between split ring 14 and the inner surface of fingers 12 of heat web 12. Preferably the brazing material to use would be CuSil, available from GTE Wesgo, or any other brazing material compatible with the copper and the molybdenum.

The expansion member 18 is then placed inside of the split ring 14 and the assembly is placed inside the laser tube. Those of ordinary skill in the art will readily recognize that in practical applications of the present invention, a plurality of such assemblies will be mounted in a laser tube and those of ordinary skill in the art will readily recognize how to use a mandrel technique to mount plurality of such assemblies inside of a laser tube.

Those of ordinary skill in the art will recognise that a complete ring made of a material such as molybdenum or kovar could be used in place of a split ring 14. In such an embodiment, expansion member 18 should be thick enough so that, when heated, it is able to deform the complete ring and thus expand it without the need for a split in the ring.

Figure 2:
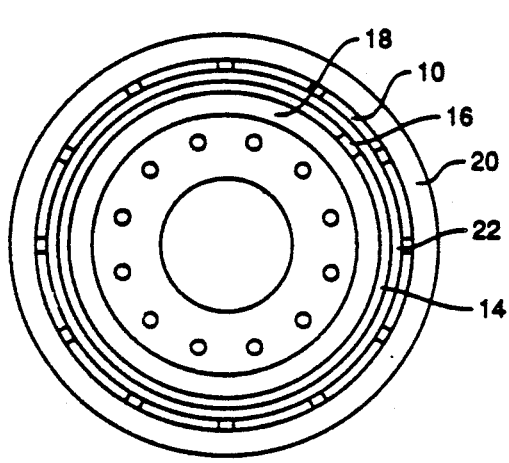
FIG. 2 is an end view of an assembly of the present invention including an expansion member, a split ring, a heat web, and a brazing material interposed between the split ring and the heat web, all mounted within a laser tube.

FIG. 2 shows the assembly of the present invention. Copper heat web 10 is shown inside of the alumina tube 20. The layer of brazing material 22 is shown in position between copper heat web 10 and split ring 14. Expansion member 18 is shown mounted within split ring 14.

After all of the assemblies have been mounted within the laser tube, the laser tube may then be placed into a brazing oven in order to braze split ring 14 to copper heat web 10. As the temperature in the brazing oven rises, expansion member 18 expands at a much greater rate then does laser tube 20, thus forcing split ring 14 into tight contact with copper heat web 10 and also forcing copper heat web 10 into tight contact with the inner wall of laser tube 20. The gap 16 in split ring 14 allows split ring 14 to easily expand into tight contact with the inner surface fingers 12 or cylindrical rim of copper heat web 10.

The assembly of the present invention may be brazed using standard and well known brazing cycles. As those of ordinary skill in the art will recognize, however, the brazing of the assembly of the present invention, when used with ion gas lasers, will be performed at the same time as the more critically processed sensitive brazing cycles which will provide vacuum seals for the laser tube. In such situations, the brazing cycles for the more critical vacuum seal parts are usable. A typical brazing cycle found to be useful for the present invention would include a first ramp up from room temperature to 700° C. at approximately 25° temperature rise per minute. This is followed by a further ramp up to 750° C. at approximately 10° C. temperature rise per minute. The brazing oven is then kept at 750° C. for approximately 15 to 20 minutes. The oven is then ramped up to 800° C. at approximately 10° C. temperature rise per minute, and kept at 800° C. for approximately three minutes. The temperature is then ramped down to approximately 500° C. at a rate of approximately 25° C. temperature change per minute. The oven may then be turned off and the cooling continued at the natural cool down rate of the oven.

At the brazing temperature, the copper heat web 10 is brazed to the split ring 14. As the assembly cools, expansion member 18 shrinks in size and laser tube 20 also shrinks in size. The now bonded assembly of copper heat web 10 and split ring 20 also shrink in size but because of the lower coefficient of thermal expansion of split ring 14 the assembly of split ring 14 and copper heat web 10 contracts at a slower rate than does laser tube 20, resulting in a very tight fit of copper heat web 10 against the inner wall of laser tube 20.

Figure 3:
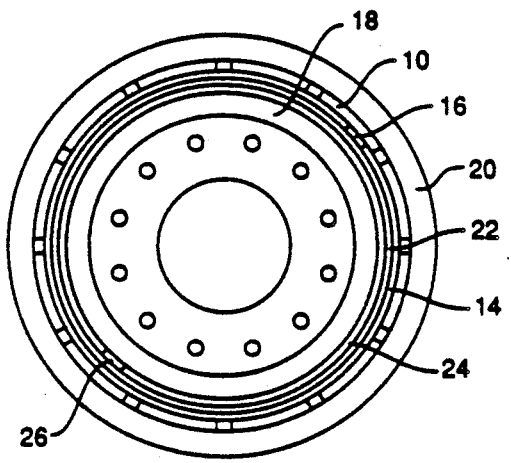
FIG. 3 is a cross-sectional view of an alternate embodiment of the assembly of the present invention within a laser tube.

In an alternative embodiment, shown in FIG. 3, wherein copper heat web 10 is mounted into alumina laser tube 20. First split ring 14 is mounted within copper heat web 12. A layer of brazing material is interposed in between first split ring 14 and a second split ring 24, whose gap 26 is offset from gap 16 of first split ring 14. In the embodiment of FIG. 3 the brazing process causes expansion member 18 to expand at a larger rate than that of alumina laser tube 20, thus causing first split ring 14 and second split ring 24 and copper heat web 10 to be forced into close contact with one another and with the inner wall of laser tube 20. Once first split ring 14 and second split ring 24 are brazed together when the assembly begins to cool the alumina tube 20 will contract at a quicker rate than will first split ring 14 and second split ring 24 thus forcing the fingers 12 of copper heat web 10 tightly against the inner wall of laser tube 20.

What is claimed is:

1. An interference-fit laser tube disk assembly, including:
    a disk of generally circular shape, having a circumferential lip normal to the plane of said disk, said disk comprising a heat conducting material,
    a split ring, fabricated from a material having a low coefficient of thermal expansion, said split ring having a diameter such that it fits within said circumferential lip of said disk and is in contact therewith,
    a layer of brazing material interposed in between said split ring and said circumferential lip,
    an expansion member, in the shape of a ring, having a diameter such that it fits snugly within said split ring when said split ring is mounted in said circumferential lip, said expansion member comprising a material having a high coefficient of thermal expansion, such that different rates of thermal expansion and contraction achieve both brazing and bonding of the assembly to the inside of said laser tube.

2. The interference-fit laser disk assembly of claim 1 wherein said circumferential lip is divided into a plurality of segments.

3. An interference-fit laser tube disk assembly, including:
    a disk of generally circular shape, having a circumferential lip normal to the lane of said disk, said disk comprising a heat conducting material,
    a first split ring, comprising a material having a low coefficient of thermal expansion, said first split ring having a diameter such that it fits within said circumferential lip of said disk and is in contact therewith,
    a second split ring, comprising a material having a low coefficient of thermal expansion, said second split ring having a diameter such that it fits within said first split ring and is in contact therewith,
    a layer of brazing material interposed in between said first and second split rings,
    an expansion member, in the shape of a ring, having a diameter such that it fits snugly within said second split ring when said first and second split rings are mounted in said circumferential lip,
    said expansion member comprising a material having a high coefficient of thermal expansion, such that different rates of thermal expansion and contraction achieve both brazing and bonding of the assembly to the inside of said laser tube.

4. A method of affixing an interference-fit laser disk inside of a laser tube, including the step of:
    placing a laser disk having a circumferential lip inside said laser tube at a selected position,
    placing a split ring comprising a material having a relatively low coefficient of thermal expansion and a layer of brazing material inside of circumferential lip such that said brazing material is interposed between said circumferential lip and said split ring and said split ring holds said brazing material against said circumferential lip,
    placing an expansion member having a high coefficient of expansion inside said split ring,
    heating said laser tube to a temperature sufficient to cause said expansion member to strongly deform said split ring into tight contact with said brazing material and to cause brazing of the split ring to said circumferential lip,
    cooling said laser tube.

* * * * *